United States Patent Office 3,766,120
Patented Oct. 16, 1973

3,766,120
SODIUM SULFATE COATED POLYACRYLAMIDE
GEL PARTICLES
David Benedict Gershberg, Stamford, Conn., assignor to
American Cyanamid Company, Stamford, Conn.
No Drawing. Original application Oct. 21, 1971, Ser. No.
191,333. Divided and this application Sept. 15, 1972,
Ser. No. 289,518
Int. Cl. C08l 47/02, 29/00
U.S. Cl. 260—29.6 Z                    5 Claims

ABSTRACT OF THE DISCLOSURE

An aqueous gel of acrylamide polymer in particulate form having sodium sulfate coated on substantially all outer surfaces thereof is a useful intermediate in the process of preparing dry acrylamide polymers. The coated gel particles have reduced tack and are more free flowing in the drying process.

CROSS-REFERENCES TO RELATED APPLICATIONS

This application is a division of my copending application, Ser. No. 191,333, filed Oct. 21, 1971 now Pat. No. 3,714,136.

BACKGROUND OF THE INVENTION

This invention pertains to the field of high molecular weight, water-soluble polymers of acrylamide. These polymers, which are useful as flocculants which settle industrial slurries and remove suspended matter from municipal or process water, should be water-soluble and have as high a molecular weight as possible.

One major problem which has been plaguing the industry for many years is the difficulty with which recovery of these high molecular weight polymers is achieved. The polymers are normally prepared as very viscous aqueous gels which must be dried in order to economically transport them in commerce. Drying of the gels, however, tends to form water-insoluble polymer and degrade the polymers thereby reducing their molecular weights and effectiveness since the higher the molecular weight thereof, the better their performance.

U.S. Pat. No. 3,255,142 discloses one method of drying and recovering these polymers, however, very large amounts of non-solvent, per unit of polymer, are required and must then be recovered at considerable expense. U.S. Pat. No. 3,002,960 described the preparation of acrylamide polymers having molecular weights of 6–26 million. Both of these patents are hereby incorporated herein by reference.

The high molecular weight polymers produced by the process of the latter patent mentioned above are typical of those known to degrade to lower molecular weight or to cross-link and form water-insoluble polymer during drying. At such high molecular weights, very few cross-links still tie up considerable polymer. Therefore, both of these phenomena, i.e. molecular weight degradation and cross-linking, are undesirable during polymer recovery, a problem well recognized by those skilled in the art.

Alternative drying procedures to that disclosed in said patent mentioned above e.g. direct drying processes, require the removal of water from large continguous masses requiring severe drying conditions of temperature and time which also substantially degrade or cross-link the polymer unless anti-degradation agents are added thereto.

SUMMARY

I have now found that high molecular weight, substantially dry, free-flowing polymers can be recovered from highly viscous aqueous gels without the substantial breakdown of molecular weight or cross-linking previously experienced. My novel process encompasses mechanically cutting undried, unprecipitated polymer gels containing up to about 70% water, into fine particles and drying said particles under unusually mild yet economical conditions to thereby obtain a free-flowing, high molecular weight, substantially non-cross-linked product.

In regard to the mildness of the drying conditions, non-solution types of polymerization i.e. suspension, emulsion and precipitation procedures, easily yield small polymer particles, without mechanical cutting, which can be dried under similarly mild conditions. However, solution polymerization differs markedly from those other systems and presents related problems of recovery of the polymer as small particles. Additionally, solution polymerization of acrylamide has the added advantage of producing the highest molecular weight product since no suspending, emulsifying or precipitation agents, which generally decrease molecular weight via chain transfer, need be employed.

It was unexpected, utilizing my novel process, that (1) polymer gels which become tacky and they "sweat," could be cut into fine particles, (2) negligible degradation of the polymer gel under the high cutting shear is effected, (3) negligible degradation or insolubles formation are caused on drying and (4) free-flowing polymer could be produced even after prolonged storage thereof.

DESCRIPTION OF THE INVENTION INCLUDING PREFERRED EMBODIMENTS

As mentioned above, my novel process comprises cutting acrylamide polymer gel into fine particles, drying the resultant particles and recovering the dried polymer in marketable form.

The polymer gels which are treated according to my novel process are produced by solution polymerization and contain from about 20% to about 70% water, preferably from about 30% to about 65%. They have a molecular weight of at least about 6 million and preferably at least about 12 million. They are cut into fine particles, according to my invention, from larger fragments having diameters of not less than about ⅛ inch, preferably from about ⅛ inch to about ½ inch.

The gels are produced from acrylamide monomer, alone or in combination with up to about 50%, by weight of other monomers copolymerizable therewith such as acrylic acid, methacrylic acid, itaconic acid, dimethylaminoethylmethacrylate and the like, the gels containing copolymers thereof in substantially identical concentrations.

The gels are fragmentized according to any known procedure such as by feeding sheets of the gel into commercially available choppers having short knives mounted tangentially on a revolving drum. The sheet may be fed through a vertical throat and the cut fragments pass through a screen and out. The screen openings can be regulated and the chopper can be operated at speeds including 1000 r.p.m.

The fragmented gels are cut into fine particles of about 7 to about 100 mesh, preferably from about 20 to about 100 mesh, by mechanical cutting. The cutting is preferably achieved via the use of a second commercially available fragmentizer, although any such means may be used. An exemplary cutter has double-edged knives mounted perpendicularly to a revolving drum and operates at speeds including 4500 r.p.m. similar to the chopper described above.

The cutting procedure is conducted at a temperature of not over about 75° C., preferably not over about 50° C., higher temperatures tending to cause sticking of the polymer to cutter surfaces.

The particles of acrylamide polymer gel are then dried by suspending them in a gas stream at a temperature ranging from about ambient to about 100° C., preferably from about 25° C. to about 80° C. for from about 5 to about 60 minutes, preferably from about 5 to about 30 minutes.

After the drying step, the polymer is recovered in a free-flowing condition by merely collecting fall-out from the gas stream or discontinuing the gas stream and evacuating the drier.

Fluid bed or flash dryers or any other system in which small particles are suspended in a gas stream may be used for drying the gel particles according to my process.

The fragments of polymer gel charged to the cutter may be rendered more free-flowing and therefore less tacky, by either of two novel features of my process. First, the fragments may be dusted or otherwise coated on their exterior surface with sodium sulfate. I have found that crystalline sodium sulfate of less than about 7 mesh in size can be dusted onto the surface of the polymer fragments without any detrimental effect on the required properties of the gel. Since the sodium sulfate is also water-soluble, no objectionable consequences result. The sodium sulfate coating may also be applied during or after drying in order to increase the shelf-life thereof.

Second, the fragments of acrylamide polymer gel may be, at least partially, frozen, thereby preventing the agglomeration of the fragments due to the tacky nature of the surface thereof. Freezing may be accomplished before or after fragmentation of the gel with liquid nitrogen, carbon dioxide etc. When the gel fragments are charged to the cutter as frozen masses, it is obviously necessary that the temperature within the cutter be maintained at about 0° C. or below. Of course, freezing and dusting with sodium sulfate can be employed simultaneously or sequentially.

The cutting of the fragments into particles may be conducted at such a temperature within the above range that an independent drying step is unnecessary. Whether such a one-stage process can be accomplished depends, however, on the particular polymer gel being treated.

The following examples are set forth for purposes of illustration only and are not to be construed as limitations on the present invention except as set forth in the appended claims.

In all examples below, sheets of acrylamide polymer ¼ inch thick are employed as charge to the fragmentizing step. They were produced by solution polymerization according to known procedures.

Commercial fragmentizers and cutters are used. The fragmentizer is as described above, the drum being 6 inches in length. The cutter used also has a 6 inch drum.

Dryer (1) is a 4 inch (inside diameter) glass column, 28 inches high and flanged at the bottom with four layers of 300 mesh screen which disperses fluidizing gas. Dryer (2) is 1¼ inch (inside diameter) glass column 24 inches high and fused at the bottom to a course porosity sintered glass disc to disperse the fluidizing gas.

The effects of cutting and drying the polymer on its molecular weight are obtained from Brookfield viscosity measurements. Viscosity data are obtained on 0.1% solutions of the polymer in 0.1 N sodium chloride at 25° C. and pH 5.5, using a Brookfield LVT viscosimeter with a UL adapter at 60 r.p.m. Weight average molecular weights are obtained from intrinsic viscosity measurements in the same solvent at 30° C. using the formula intrinsic viscosity (deciliters/g.)=$3.73 \times 10^{-4}(M)^{0.66}$ Brookfield viscosities of 4.40 and 6.60 cp. designate molecular weights of about 8 million and 14 million, respectively. PAM represents polyacrylamide.

Example 1

A fragmentizer, as described above, is fitted with a screen having 7/16" square openings. 3.8 pounds of polymer gel, 50% PAM and 50% water, are cut into strips 5" wide x 21" long, and then fed to the above described cutter (1). 3.6 pounds of particles, ⅛"–7/16" are recovered. The remainder stay as loose particles in the cutter.

A cutter (2), as described above, is fitted with a screen having 7 mesh round openings. 3.6 pounds of the product from cutter (1) are dusted with 0.36 pound of sodium sulfate and then fed to cutter (2), during 2.5 minutes, at the rate of 96 lbs./hr. 3.2 pounds of particles are recovered whose sizes range from 7–100 mesh and are mostly 7–14 mesh. The remainder stay as loose particles in the cutter.

Example 2

This example illustrates operation of a cutter in which the particles are frozen with a stream of liquid $CO_2$ while they are being cut.

The fragmentizer is set up as in Example 1. 12.5 pounds of polymer gel, 50% PAM and 50% water, are fed to the cutter (1), during 4.8 minutes, at the rate of 157 lbs./hr. 9.5 pounds of product ⅛"–7/16" are dusted with 0.48 pounds of sodium sulfate.

The cutter (2) is also set up as in Example 1 except that liquid $CO_2$ was fed to the cutting area through two ports in the feed throat. 2.0 pounds of the dusted product from cutter (1) are fed to cutter (2), during 2.4 minutes, at the rate of 50 lbs./hr. The cut particles are 7–100 mesh.

Example 3

This example illustrates operation of the cutter in which the particles are frozen with a stream of liquid nitrogen while they are being cut.

The cutter (2) of Example 1 is set up with a 4 mesh screen. 2.0 pounds of dusted product from the fragmentizer of Example 2 are fed to the cutter during 0.8 minute, at the rate of 150 lbs./hr. Simultaneously, liquid nitrogen is fed to the cutting area through two ports in the feed throat. 1.5 pounds of particles are recovered ranging from 4–100 mesh, mostly 4–14 mesh.

Example 4

This example illustrates the cutting of polymer containing 65% water, in which the feed to the cutter is first pre-frozen with liquid nitrogen.

The fragmentizer is set up as in Example 1. 13 pounds of polymer gel, 35% PAM and 65% water, in the form of ⅜"–½" thick sheets, are fed to the cutter (1), during 5.2 minutes, at the rate of 150 lbs./hr. 10.8 pounds of particles, ⅛"–7/16" are recovered. 4.0 pounds of these particles are placed in a container and alternately sprayed with a liquid nitrogen stream and mixed until they are frozen.

The cutter (2) is set up with a 7 mesh screen. The 4 pounds of frozen particles are fed to the cutter, during 0.6 minute, at the rate of 400 lbs./hr. Simultaneously, liquid nitrogen is fed to the cutting area through two ports in the feed throat. 3.0 pounds of particles are recovered ranging from 7–100 mesh.

The cutter (2) is set up with a finer (20 mesh) screen and operated as above with 2.0 pounds of product from the fragmentizer (after it was pre-frozen with liquid nitrogen), during 1.2 minutes, at the feed rate of 100 lbs./hr. An additional 2.0 pounds of frozen particles are fed, during 0.6 minute at the rate of 200 lbs./hr. 4.0 pounds of particles are recovered ranging from 20–100 mesh, mostly 20–60 mesh.

Example 5

This example illustrates the cutting of a very high molecular weight polymer gel containing 50% water into fine particles, which are then fluid bed-dried under mild yet economical conditions of temperature and time with essentially no loss in molecular weight and no insoluble polymer formation.

The fragmentizer is set up as in Example 1. The feed was a PAM gel, 50% polymer and 50% water, with a Brookfield viscosity of 6.60 cp. corresponding to a molecular weight of about 14 million. Twenty pounds of the gel are fed to the fragmentizer during 12 minutes, at the rate of 100 lbs./hr. 17 pounds of particles 1/8″–7/16″ are recovered. 14 pounds of these particles are placed in a container and alternately sprayed with cold $CO_2$ and mixed until they are frozen. The frozen particles are fed to cutter (2) fitted with a 7 mesh screen, at the rate of 50 lbs./hr. 13.5 pounds of particles are recovered ranging from 7–100 mesh, mostly 7–28 mesh. While still frozen, the particles are dusted with 2.0 pounds of sodium sulfate and allowed to come to room temperature. The added sulfate and slight drying during the cutting operation raises the total solids to 62%.

Various quantities of the cut and dusted particles are dried in a fluid bed dryer (1) or (2) in either an air or nitrogen stream. The fluidizing velocities used are suitable for commercial dryers. The polymer contents of the dried products are determined from moisture measurements and from measurements of the sodium sulfate content (by ashing). Brookfield viscosities are then measured based on the known polymer contents.

Table I shows the operating conditions in the dryers and the properties of the dried polymers. It can be seen that mild inlet gas temperatures (40–80° C.) and bed temperatures (<25–54° C.) and short residence times (8–20 minutes), typical of those employed in commercial fluid bed dryers, yield free-flowing polymer granules containing 83–89% total solids. The dried products have negligible water-insoluble polymer, and undergo a negligible loss in molecular weight during the cutting and drying operations. Thus their Brookfield viscosity losses are 0.0–0.3 cp. corresponding to molecular weight losses ranging from 0–1 million.

at the rate of 100 lbs./hr. 17 pounds of particles 1/8″–7/16″ are recovered and are dusted with 0.85 pound of sodium sulfate.

The cutter (2) is set up with a 7 mesh screen. The dusted product of the fragmentizer is pre-frozen with liquid $CO_2$ and then fed to the cutter in approximately 4 lb. batches at feed rates of 50–100 lbs./hr. 16.2 pounds of particles are recovered ranging from 7–100 mesh, mostly 7–20 mesh.

15.8 pounds of these particles are dusted with 1.5 pounds of sodium sulfate. 12.6 pounds of these are dusted with an additional 1.1 pounds of sodium sulfate. As a result of the sulfate additions and some slight drying during cutting, the material contains 43% polymer, 19% sodium sulfate and 38% water.

5.7 pounds of this product is placed in a sealed 15 gallon polyethylene bag. The bag is stored horizontally so that the particles are about 1½ inches deep. After six weeks of storage, the particles, despite their relatively high water content and large surface area, remain free-flowing.

Examples 13–16

The polymer particles produced according to Examples 1–4, inclusive, above, are dried as in Example 5, Table I. In each instance, the loss in molecular weight and the presence of water-insoluble polymer are negligible.

Example 17

The PAM of Example 5 is replaced with a copolymer of acrylamide and acrylic acid 85/15. All else remains constant. Similar results are achieved.

Example 18

Replacement of the PAM of Example 6 with a copolymer of acrylamide and dimethylaminoethylmethacrylate

TABLE I.—FLUID BED DRYING OF CUT PAM GEL

[Brookfield viscosity of uncut and undried PAM=6.60 c.p. Feed to dryer is 7-100 mesh and contains 62% total solids]

| Example | Dryer conditions | | | | | | | | Dried product properties | | | | |
|---|---|---|---|---|---|---|---|---|---|---|---|---|---|
| | Dryer No. | Charge (parts) | Fluidizing gas | | | Time (min.) | Bed temp. (° C.) | Free-flowing | Total solids (percent) | Water-insolubles | Brookfield viscosity (c.p.) | Viscosity loss[1] (cp.) |
| | | | Type | Velocity (f.p.m.) | Inlet temp. (° C.) | | | | | | | |
| 5 | 1 | 25 | Air | 195 | 60 | 10 | <25–49 | Yes | 83 | Negligible | 6.39 | 0.21 |
| 6 | 1 | 25 | Air | 195 | 60 | 20 | 28–54 | Yes | 89 | ...do... | 6.32 | 0.28 |
| 7 | 1 | 25 | Air | 195 | 80 | 8 | <25–49 | Yes | 84 | ...do... | 6.29 | 0.31 |
| 8 | 1 | 25 | N₂ | 195 | 60 | 10 | <25–48 | Yes | 84 | ...do... | 6.60 | 0.0 |
| 9 | 2 | 600 | Air | 285 | 40 | 20 | <25–48 | Yes | 82 | ...do... | 6.30 | 0.30 |
| 10 | 2 | 600 | Air | 285 | 40 | 20 | 21–31 | Yes | 82 | ...do... | 6.39 | 0.21 |

[1] Total viscosity loss from cutting plus drying.

Example 11

This example demonstrates that cut polymer gel can be fluid bed-dried in a reasonable time even with no heat input to the dryer (ambient inlet air).

Dryer (1) is used. The feed is 25 parts of 28–100 mesh PAM gel particles containing 61% total solids. Before cutting and drying, the polymer has a Brookfield viscosity of 5.65 cp.

The gel particles are dried with ambient air entering at 25° C., at a fluidizing velocity of about 300 f.p.m., for 30 minutes. The dried product contained 83% total solids and is free-flowing. The dried polymer has no loss of Brookfield viscosity.

Example 12

This example illustrates the operation of cutting a polymer gel into fine particles which are then kept sufficiently free-flowing without drying by dusting them with a suitable powder.

The fragmentizer is set up as in Example 1. The feed is a PAM gel, 50% polymer and 50% water. Twenty pounds of the gel are fed to cutter (1) during 12 minutes results in the recovery of a dried copolymer of insignificant molecular loss and a negligible content of insolubles.

I claim:

1. An aqueous gel of a polymer of acrylamide in particulate form having sodium sulfate coated on substantially all outer surfaces thereof.

2. A gel according to claim 1 wherein the polymer is polyacrylamide.

3. A gel according to claim 1 wherein the molecular weight of said polymer is at least about 12 million.

4. A gel according to claim 1 wherein said polymer is a copolymer of acrylamide and acrylic acid.

5. A gel according to claim 1 wherein said polymer is polyacrylamide having a molecular weight of at least about 12 million.

No references cited.

MELVIN GOLDSTEIN, Primary Examiner

U.S. Cl. X.R.

117—16, 100 C, 138.8 UA; 260—80.3 N, 89.7 S